UNITED STATES PATENT OFFICE.

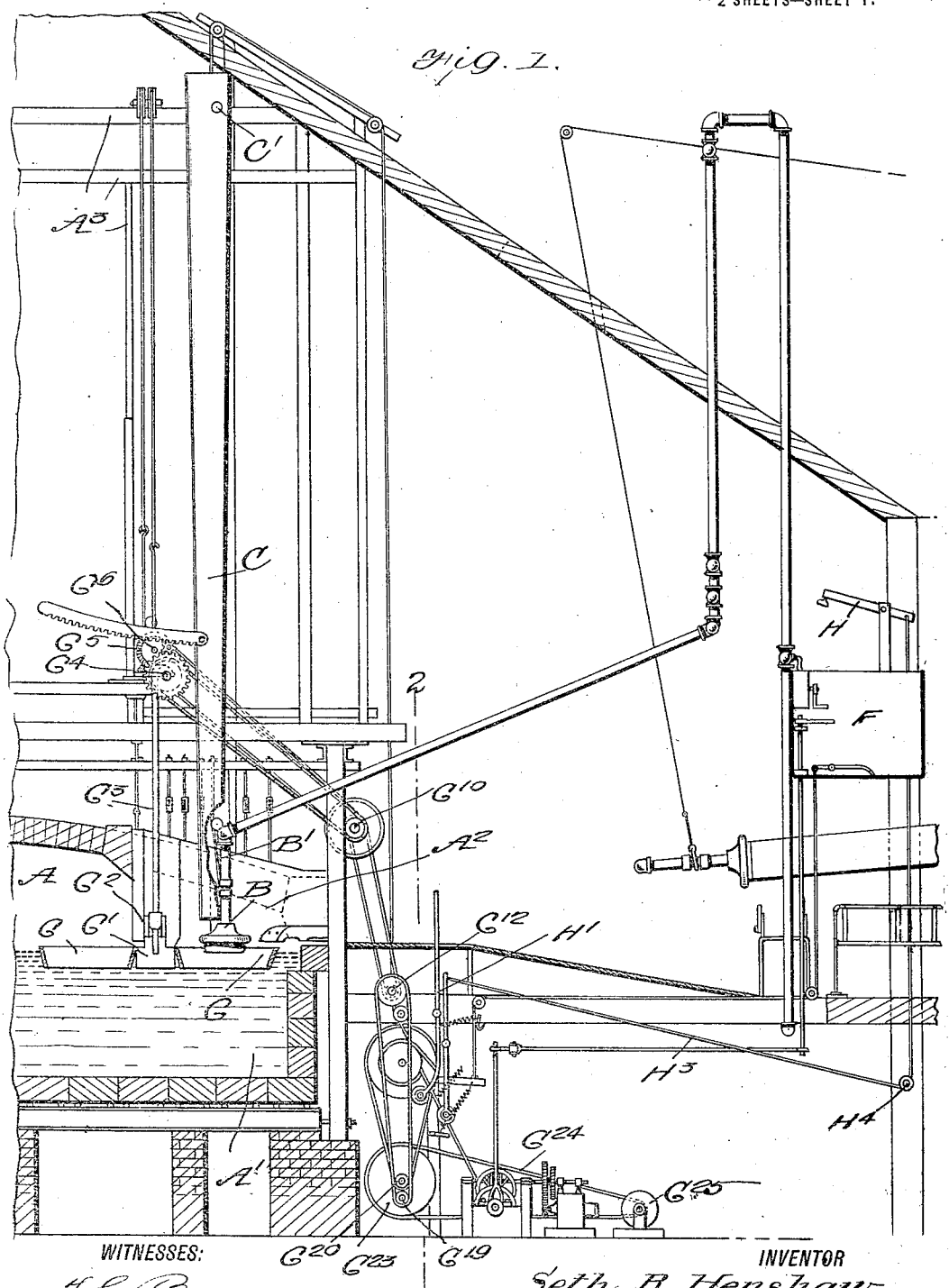

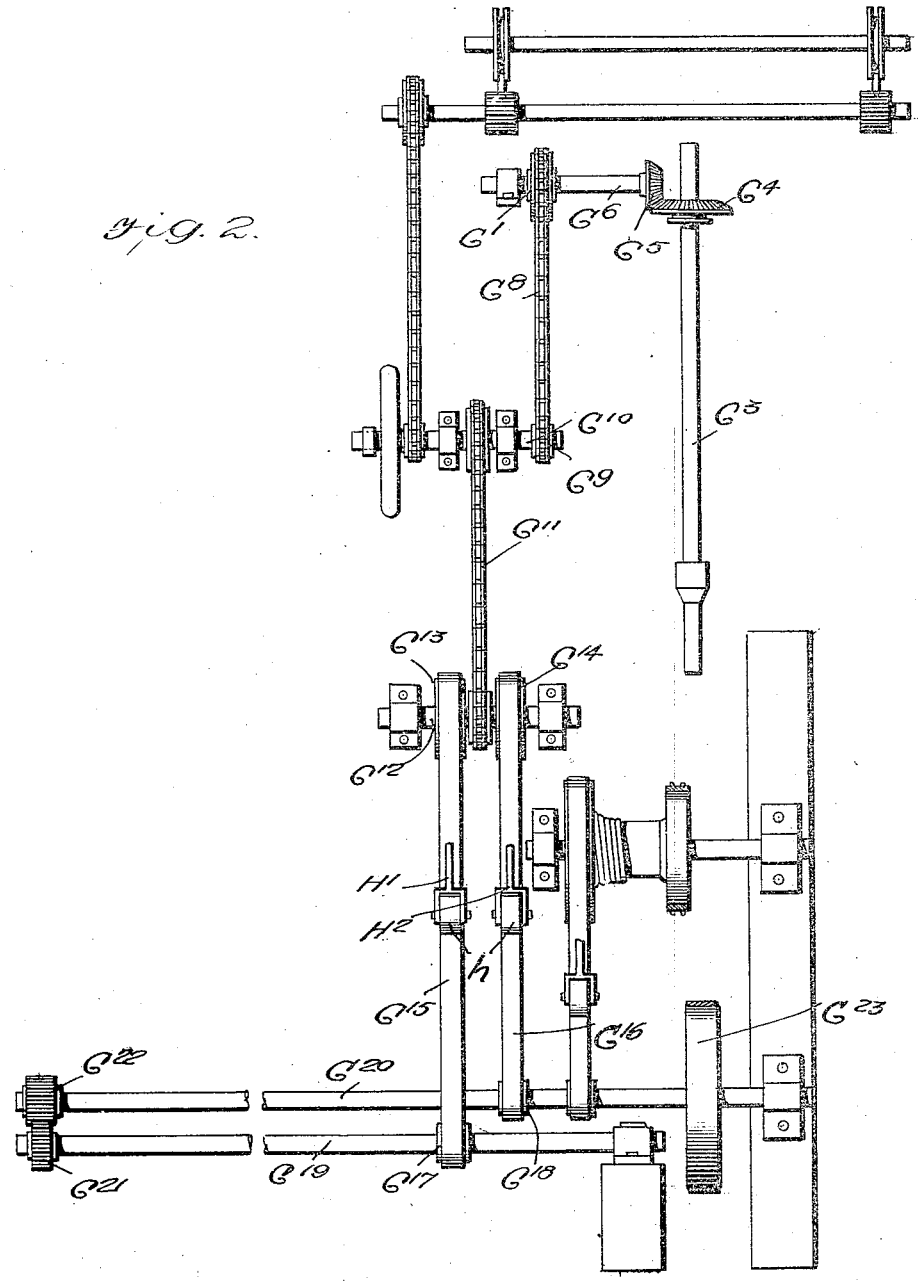

SETH B. HENSHAW, OF CHARLESTON, WEST VIRGINIA, ASSIGNOR TO CHARLESTON WINDOW GLASS CO., OF CHARLESTON, WEST VIRGINIA, A CORPORATION OF WEST VIRGINIA.

DRAWING-RING AND OPERATING MEANS THEREFOR.

1,203,333.  Specification of Letters Patent.  Patented Oct. 31, 1916.

Original application filed September 2, 1915, Serial No. 48,634. Divided and this application filed February 10, 1916. Serial No. 77,449.

*To all whom it may concern:*

Be it known that I, SETH B. HENSHAW, a citizen of the United States, and a resident of Charleston, in the county of Kanawha and State of West Virginia, have invented a certain new and useful Improvement in Drawing-Rings and Operating Means Therefor, of which the following is a specification.

My present invention relates generally to window glass machinery, of that type described and shown in my application Number 48634, filed September 2, 1915, and of which the present application is a division.

More particularly speaking, my present improvements relate to the drawing rings employed upon the surface of the molten glass within the drawing chamber, and to the means by which these rings may be conveniently and effectively controlled by an operator at a point distant from and overlooking, the drawing chamber itself.

In the accompanying drawings illustrating my present improvements, Figure 1 is a vertical transverse section through a part of one side of a glass furnace equipped with my improvements, and Fig. 2 is an elevation, more or less diagrammatic, of the connections for the ring turning shaft, looking substantially along line 2—2 of Fig. 1.

Referring now to these figures, and particularly to Fig. 1, there is shown a melting furnace at A, the tank A' of which forms a part thereof, and communicates therewith at one side, and may have a plurality of drawing chambers along the furnace, one of which is seen at $A^2$, it being noted that the chamber is formed through the crown or cap of the furnace, permitting the cylinders to be drawn vertically and directly out of the molten glass within the tank, through the use of a drawing bait B in its cage B' movable vertically in the guide C, the latter being pivoted at C' at its upper end in the superstructure $A^3$ of the furnace, whereby to permit its lower end to be shifted outwardly when the drawing operation has been finished, preparatory to taking down the drawn cylinder.

The drawing of a cylinder and its taking down, are both controlled from an operator's box F which, as seen in Fig. 1, is placed somewhat distant from, although overlooking the drawing chamber. In addition to the control of the drawing and taking down operations as described and shown in my application above mentioned, a series of overhead levers H, two for each drawing chamber, are mounted directly over the operator's box F and within convenient reach of the operator stationed therein, for the manual control of the rotation of the fire clay rings G, of which there are a pair in each chamber, the pair so disposed in chamber $A^2$, as seen in Fig. 1, being connected by a spider G' of similar material, and a socket wrench $G^2$, the latter detachably connecting the spider to a vertical shaft $G^3$ at the inner portion of the drawing chamber.

The shaft $G^3$, mounted as just above stated and engaging the spider G' in such manner that upon its rotation, the spider G' and rings G are also rotated, is provided at its upper end with a bevel gear $G^4$ as seen in Fig. 2, in mesh with a bevel gear $G^5$ at one end of a countershaft $G^6$, having at its opposite end a sprocket wheel $G^7$ connected by a sprocket chain $G^8$ to a sprocket wheel $G^9$ secured upon an intermediate shaft $G^{10}$, this latter shaft $G^{10}$ being connected by a sprocket chain $G^{11}$ to another intermediate shaft $G^{12}$. This latter shaft $G^{12}$, as plainly seen in Fig. 2, has a pair of pulleys $G^{13}$ and $G^{14}$ secured thereon and connected by normally inoperative belts $G^{15}$ and $G^{16}$ to the pulleys $G^{17}$ and $G^{18}$ respectively of a pair of driven shafts $G^{19}$ and $G^{20}$.

The shafts $G^{19}$ and $G^{20}$ just mentioned are arranged in parallel relation and connected by intermeshing gears $G^{21}$ and $G^{22}$, shaft $G^{20}$ also having an enlarged pulley $G^{23}$ which, as seen in Fig. 1, is connected by a belt $G^{24}$ with a driving motor $G^{25}$ which latter serves to continuously rotate shafts $G^{19}$ and $G^{20}$.

Adjacent each of the drawing chambers, and opposite the belts $G^{15}$ and $G^{16}$ above mentioned, are intermediately pivoted a pair of belt tightening members H' and $H^2$, the lower ends thereof carrying rollers $h$ movable into engagement with the said belts to tighten the same and transmit rotation to the shaft $G^{12}$ in a direction dependent upon which one of the said belts $G^{15}$ and $G^{16}$ is, in fact, tightened. To the upper end of each of the belt tightening members H' and $H^2$, is connected one end of a flexible connection $H^3$ in the form of a cable which extends upwardly around a roller H⁴ and is secured at its upper end to one end of the respective lever H before mentioned above the operator's box F.

Thus, with the parts constructed and arranged as shown and described above, the operator may control not only the operation of the rings G within the furnace, but may, furthermore, control the direction of such rotation to bring a new ring into registry with the lower portion of the drawing chamber at the beginning of each drawing operation, ready for the lowering of the bait B thereinto, by the lowering of the bait cage B′ in its guide C.

I claim:—

1. In window glass machinery, a drawing chamber, floating rings therein, a rotatable vertical shaft to which the rings are connected, means for rotating the shaft in relatively opposite directions, manual controlling means for controlling said rotating means, and an elevated control station in which said manual controlling means are located.

2. In window glass machinery, a drawing chamber, floating rings therein, a rotatable vertical shaft to which the rings are connected, means for rotating the said shaft in relatively opposite directions, an elevated control box overlooking the said drawing chamber, and manually actuated means for controlling the direction of rotation of the said vertical shaft, located adjacent said control box and within reach of the operator therein.

3. In window glass machinery, a drawing chamber, floating rings therein, a rotatable vertical shaft to which the rings are connected, a pair of parallel driven shafts rotating in opposite directions, an intermediate shaft gearedly connected to the said vertical shaft, normally inactive belt connections between said parallel shafts and the said intermediate shaft and moving in relatively opposite directions when engaged with the former, means whereby to move each of said connections to active position, and manually controlled connections for actuating said last-named means.

4. In window glass machinery, a drawing chamber, floating rings therein, a rotatable vertical shaft to which the rings are connected, means for rotating the shaft in relatively opposite directions, including a pair of parallel driven shafts rotating in opposite directions, an intermediate shaft gearedly connected to the said vertical shaft, and normally loose belts connecting said parallel shafts with said intermediate shaft and moving in relatively opposite directions when engaged with the former, belt tightening members adjacent to said belts, and manually controlled connections for actuating each of said belt tightening members.

5. In window glass machinery, a drawing chamber, floating rings therein, a rotatable vertical shaft to which the rings are connected, a pair of parallel driven shafts rotating in opposite directions, a pair of pulleys carried thereby, a shaft gearedly connected to the said vertical shaft, a pair of pulleys carried by the latter shaft, normally loose belts each connecting one of said last named pulleys with one of the first named pulleys and moving in relatively opposite directions when engaged with the latter, belt tightening members adjacent to said belts, and manually controlled connections for actuating each of said belt tightening members for the purpose described.

SETH B. HENSHAW.

Witnesses:
O. P. Fitzgerald,
I. F. Brown.